(12) United States Patent
Werthman et al.

(10) Patent No.: US 7,306,489 B2
(45) Date of Patent: Dec. 11, 2007

(54) PERFORMANCE INDICATING ELECTRICAL CONNECTOR

(75) Inventors: Paul A Werthman, Canterbury, NH (US); Gary E Schrader, Manchester, NH (US); Peter A Waltz, Bristol, NH (US); Alan Beck, Bow, NH (US); Michael Rzasa, Nashua, NH (US)

(73) Assignee: FCI Americas Technology, Inc., Reno, NV (US)

( * ) Notice: Subject to any disclaimer, the term of this patent is extended or adjusted under 35 U.S.C. 154(b) by 475 days.

(21) Appl. No.: 11/172,223

(22) Filed: Jun. 29, 2005

(65) Prior Publication Data

US 2006/0019540 A1 Jan. 26, 2006

Related U.S. Application Data

(60) Provisional application No. 60/591,307, filed on Jul. 26, 2004.

(51) Int. Cl.
*H01R 13/66* (2006.01)
(52) U.S. Cl. .................................. 439/620.01
(58) Field of Classification Search ............... 439/620, 439/620.01
See application file for complete search history.

(56) References Cited

U.S. PATENT DOCUMENTS

| | | | | |
|---|---|---|---|---|
| 4,170,190 A | | 10/1979 | Warner ..................... 116/206 |
| 4,470,711 A | * | 9/1984 | Brzozowski ................ 374/179 |
| 4,891,250 A | | 1/1990 | Weibe et al. ............... 374/162 |
| 5,036,164 A | | 7/1991 | Schrader et al. ........... 174/94 R |
| 5,103,068 A | | 4/1992 | Schrader ................... 174/94 R |
| 5,162,615 A | | 11/1992 | Schrader et al. .......... 174/94 R |
| 5,188,542 A | * | 2/1993 | Ballman ..................... 439/620 |
| 5,200,576 A | | 4/1993 | Schrader et al. .......... 174/94 R |
| 5,552,564 A | | 9/1996 | Schrader et al. .......... 174/84 C |
| 5,567,175 A | * | 10/1996 | Warden et al. ............. 439/490 |
| 5,786,626 A | * | 7/1998 | Brady et al. ................ 257/673 |
| 6,114,941 A | | 9/2000 | Scott ......................... 337/332 |
| 6,412,977 B1 | * | 7/2002 | Black et al. ................ 374/178 |
| 6,525,270 B1 | | 2/2003 | Connor et al. ............ 174/84 C |
| 6,538,204 B2 | | 3/2003 | Connor ..................... 174/84 R |
| 6,552,271 B2 | | 4/2003 | Connor et al. ............ 174/84 R |
| 6,784,802 B1 | * | 8/2004 | Stanescu ..................... 340/687 |
| 6,818,830 B2 | | 11/2004 | O'Grady et al. .......... 174/84 C |
| 6,846,989 B2 | | 1/2005 | Sokol et al. ............... 174/84 C |
| 2005/0242086 A1 | | 11/2005 | Imura ......................... 219/627 |
| 2005/0285735 A1 | | 12/2005 | Imura et al. ............ 340/539.27 |
| 2006/0006987 A1 | | 1/2006 | Hashimoto et al. ...... 340/10.51 |

FOREIGN PATENT DOCUMENTS

DE  10244304 B3  3/2004

* cited by examiner

*Primary Examiner*—Ross Gushi
(74) *Attorney, Agent, or Firm*—Harrington & Smith, PC

(57) ABSTRACT

An electrical connector including a connector section and a connector performance indicating section. The connector section includes a first connection section adapted to connect to a first electrical conductor and a second connection section adapted to connect to a second electrical conductor. The connector section is adapted to electrical connect the first electrical conductor to the second electrical conductor. The connector performance indicating section is connected to a portion of the connector section. The connector performance indicating section includes a temperature sensitive indicator adapted to signal occurrence of a temperature of the portion of the connector section above a predetermined temperature. The temperature sensitive indicator comprises a Radio Frequency Identification (RFID) tag.

17 Claims, 8 Drawing Sheets

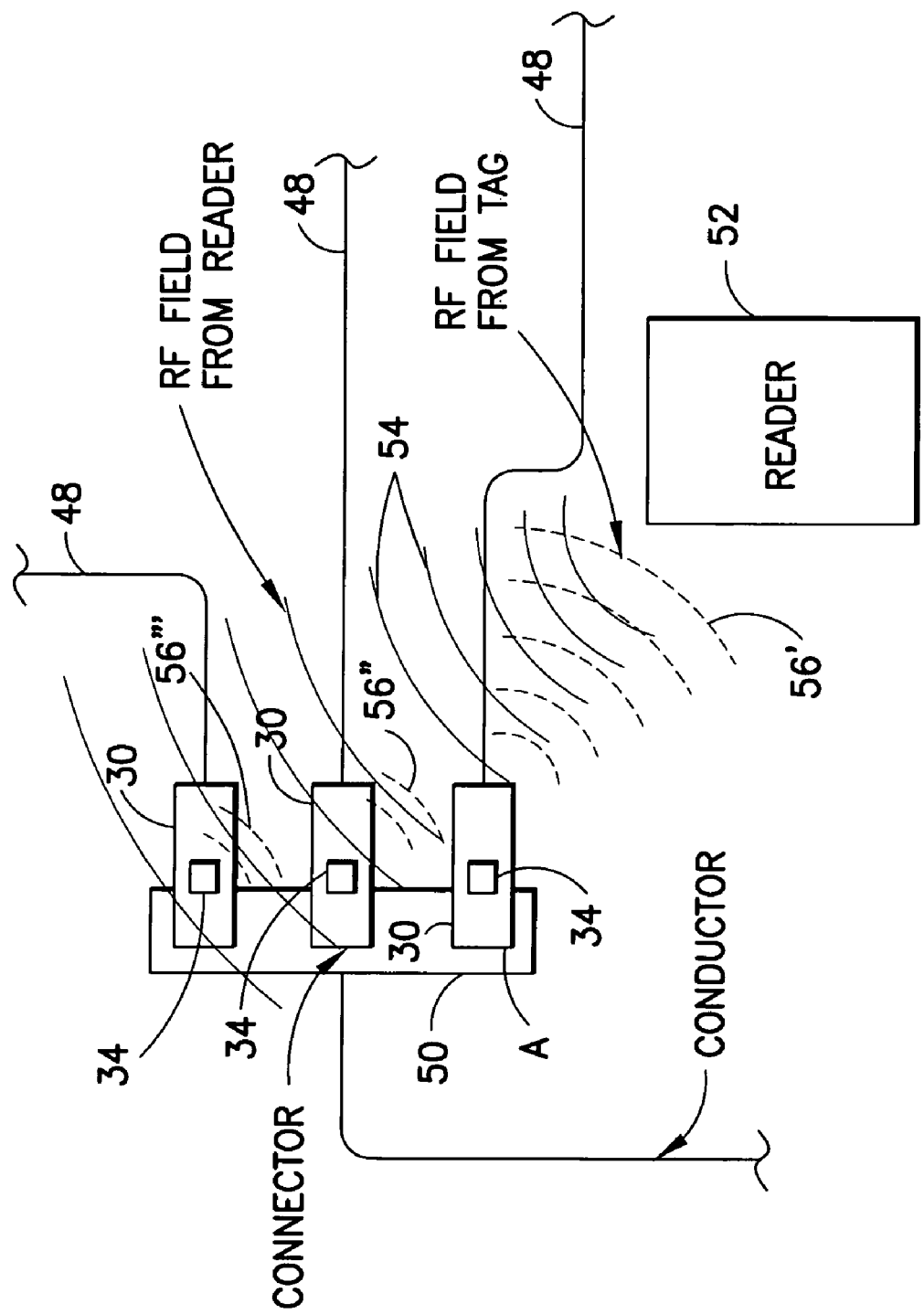

| CONNECTOR | DATE/TIME | TEMPERATURE |
|---|---|---|
| CONN1 | 05-05-2005:12:24 | 98 |
| CONN2 | 05-05-2005:12:24 | 88 |
| CONN3 | 05-05-2005:12:24 | 105 |
| CONN1 | 05-05-2005:12:34 | 87 |
| CONN2 | 05-05-2005:12:34 | 103 |
| CONN3 | 05-05-2005:12:34 | 98 |
| CONN1 | 05-05-2005:12:44 | 97 |
| CONN2 | 05-05-2005:12:44 | 88 |
| CONN3 | 05-05-2005:12:44 | 106 |

FIG.14

PERFORMANCE INDICATING ELECTRICAL CONNECTOR

CROSS REFERENCE TO RELATED APPLICATION

This application claims priority under 35 U.S.C. §119(e) on provisional patent application No. 60/591,307 filed Jul. 26, 2004 which is hereby incorporated by reference in its entirety.

BACKGROUND OF THE INVENTION

1. Field of the Invention

The invention relates to electrical connectors and, more particularly, to a performance indicating section on an electrical connector.

2. Brief Description of Prior Developments

Radio Frequency Identification (RFID) is a technology similar in theory to bar code identification. With RFID, the electromagnetic or electrostatic coupling in the RF portion of the electromagnetic spectrum is used to transmit signals. An RFID system consists of an antenna and a transceiver, which read the radio frequency and transfer the information to a processing device, and a transponder, or tag, which is an integrated circuit containing the RF circuitry and information to be transmitted.

RFID systems can be used for items such as clothing tags, missiles, pet tags, food; anywhere that a unique identification system is needed. The tag can carry information as simple as a pet owner's name and address, or the cleaning instruction on a sweater, to as complex as instructions on how to assemble a car. Some auto manufacturers use RFID systems to move cars through an assembly line. At each successive stage of production, the RFID tag tells the computers what the next step of automated assembly is.

One of the key differences between RFID and bar code technology is that RFID eliminates the need for line-of-sight reading that bar coding depends on. Also, RFID scanning can be done at greater distances than bar code scanning. High frequency RFID systems (850 MHz to 950 MHz and 2.4 GHz to 2.5 GHz) offer transmission ranges of more than 90 feet, although wavelengths in the 2.4 GHz range are absorbed by water (the human body) and therefore has limitations. RFID is also called dedicated short range communication (DSRC).

Electrical connectors are subjected to electrical loads. As current passes through a conductor (wire and/or wire with a connector) it sees resistance and generates heat. It is common practice to measure connector performance by tracking temperature. In a laboratory environment this is usually done with a thermocouple. In the field, electrical power connectors are sometimes checked using infra-red thermal imaging devices.

Phase change temperature indicating labels and paints are known providing the feature of a permanent color change when a specified temperature is exceeded. For example, Lakfabriek Korthals BV, of Ijmuiden, The Netherlands sells Therm-O-Signal™ coatings which by a perceptible change in color indicate that a pre-selected temperature has been reached or exceeded. Telatemp Corporation of Fullerton, Calif. sells irreversible temperature labels which contain one or more sealed temperature sensitive chemical indicators which sense and record surface temperatures.

There is a desire to provide a connector design providing direct performance feedback for field application and maintenance.

SUMMARY OF THE INVENTION

In accordance with one aspect of the invention, an electrical connector is provided including a connector section and a connector performance indicating section. The connector section includes a first connection section adapted to connect to a first electrical conductor and a second connection section adapted to connect to a second electrical conductor. The connector section is adapted to electrical connect the first electrical conductor to the second electrical conductor. The connector performance indicating section is connected to a portion of the connector section. The connector performance indicating section includes a temperature sensitive indicator adapted to signal occurrence of a temperature of the portion of the connector section above a predetermined temperature. The temperature sensitive indicator comprises a Radio Frequency Identification (RFID) tag.

In accordance with another aspect of the invention, an electrical connector is provided comprising a connector section and a connector performance indicating section. The connector section comprises a first connection section adapted to connect to a first electrical conductor and a second connection section adapted to connect to a second electrical conductor, wherein the connector section is adapted to electrical connect the first electrical conductor to the second electrical conductor. The connector performance indicating section is connected to a portion of the connector section, wherein the connector performance indicating section comprises a Radio Frequency Identification (RFID) section comprising at least one RFID chip.

In accordance with one method of the invention, a method of assembling an electrical connector is provided comprising providing an electrical connector section adapted to electrically and mechanically connect a first electrical conductor to a second electrical conductor; and providing a connector performance indicating section on the electrical connector section, wherein the connector performance indicating section comprises a Radio Frequency Identification (RFID) adapted to signal a condition of the electrical connector.

In accordance with another method of the invention, a method of inspecting an electrical connector is provided comprising providing the electrical connector with a connector performance indicating section comprising a Radio Frequency Identification (RFID) section; sending a first radio frequency signal to the RFID section; and transmitting a second radio frequency signal from the RFID section based upon the first radio frequency signal and a condition of the electrical connector.

BRIEF DESCRIPTION OF THE DRAWINGS

The foregoing aspects and other features of the invention are explained in the following description, taken in connection with the accompanying drawings, wherein:

FIG. 7 is a diagram showing use of a system incorporating features of the invention;

FIG. 14 is a diagram shown a possible display of data on a reader;

DETAILED DESCRIPTION OF THE PREFERRED EMBODIMENTS

Figure 1:
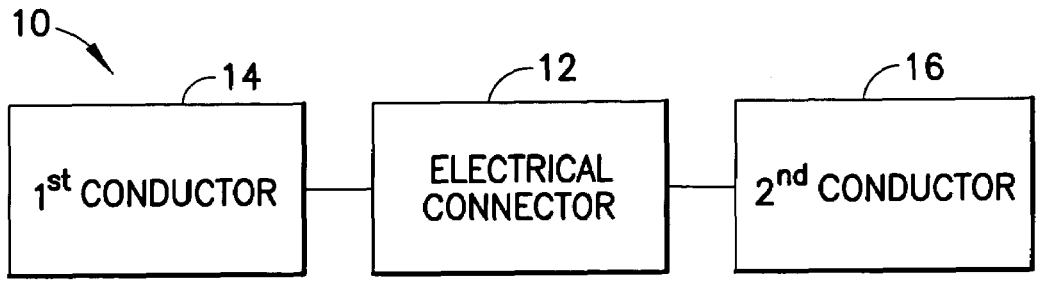
FIG. 1 is a block diagram of a connector system having an electrical connector incorporating features of the invention.

Referring to FIG. 1, there is shown a block diagram of a connector system 10 having an electrical connector 12 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

Figure 2:
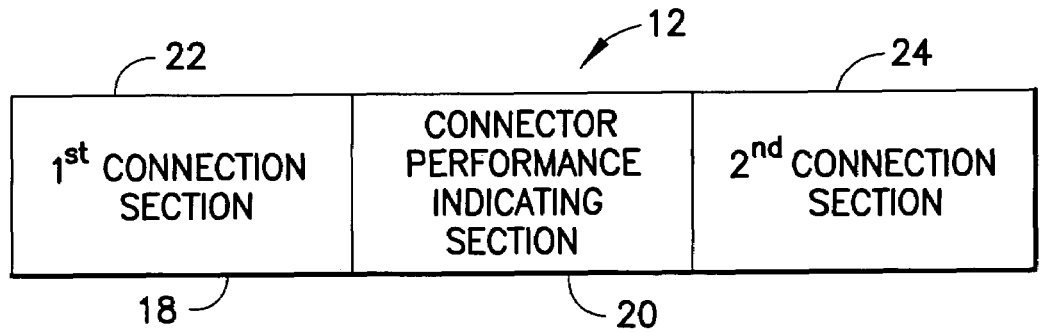
FIG. 2 is a block diagram of the electrical connector shown in FIG. 1 showing the connector performance indicating section.

The electrical connector 12 is adapted to electrically connect a first electrical conductor 14 with a second electrical conductor 16. Referring also to FIG. 2, the electrical connector 12 generally comprises a connector section 18 and a connector performance indicating section 20 connected to the connector section. The connector section 18 comprises a first connection section 22 and a second connection section 24. In an alternate embodiment the connector section could comprise more than two connection sections. The connector section 18 could comprise any suitable shape. The connector section 18 could also be comprised of a one-piece member or a multi-piece member(s). The first connection section 22 is adapted to electrically and mechanically connect to the first conductor 14. The second connection section 24 is adapted to electrically and mechanically connect to the second conductor 16. The first connection section 22 and/or the second connection section 24 could comprise any suitable type of connection sections including, for example, compression sections, press-fit sections, fastener receiving sections, etc.

The connector performance indicating section 20 is connected to the connector section in any suitable fashion. For example, the connector performance indicating section 20 could be painted onto the connector section 18, or attached to the connector section such as by adhesive or epoxy, or retained to the connector section by a fastener, or retained by a deformed portion of the connector section, or received in a slot shaped receiving section of the connector section 18.

The connector performance indicating section 20 preferably comprises a temperature sensitive chemical indicator or phase change temperature indicator adapted to signal and permanently record a temperature of a portion of the connector section above a predetermined temperature.

The connector performance indicating section 20 could comprise a phase change temperature indicating sticker, label or paint providing the feature of a permanent color change when a specified temperature is exceeded. For example, a coating which, by a perceptible change in color indicate that a pre-selected temperature has been reached or exceeded, such as Therm-O-Signal™ sold by Lakfabriek Korthals BV, of Ijmuiden, The Netherlands could be used as the connector performance indicating section 20. As another example, the connector performance indicating section 20 could be an irreversible temperature label which contains one or more sealed temperature sensitive chemical indicators which sense and record surface temperatures, such as sold by Telatemp Corporation of Fullerton, Calif. In alternate embodiments, any suitable type of temperature sensitive connector performance indicating section could be provided on the electrical connector 12.

This invention provides a connector design with a direct performance feedback for field application and maintenance. The phase change temperature indicating material could be directly applied to the electrical connector during manufacture. If the connector exceeds an allowable application temperature during service, the color on the exterior of the connector can change. This can provide direct feedback that a maintenance issue exists.

There are at least two primary applications of the invention. The first application is for power connectors. As described above any power connector exceeding an application temperature would have its indicator change color permanently. This permanent color change provides an advantage versus infra-red thermal imaging devices that only show temperature at a given point in time. With an infra-red thermal imaging device, if the circuit being measured is not currently under an electrical load the infra-red thermal imaging will not detect a high resistance joint. With the invention, on the other hand, the connector performance indicating section 20 will record an excess temperature which can be read at a later time after the excess heat occurs.

A second application exists for grounding connectors. In this case a connector may not see a fault current for a long period of time. However, when a fault does occur, and is of a sufficiently large magnitude, the connector can experience damage reducing future performance and safety. If the phase change material is used with a grounding connector, it will have the ability to show that a fault current was experienced as indicated by color change. A field maintenance person can then have the opportunity to inspect the connector and other surrounding equipment for possible damage and take corrective action. Of course, the invention could be used in applications other than power and ground applications.

Figure 3:
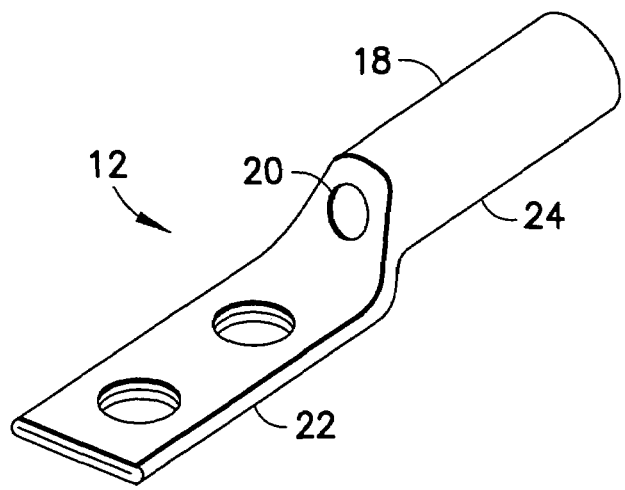
FIG. 3 is a perspective view of one embodiment of the electrical connector shown in FIG. 2.

The following illustrations are offered to show one way the phase change material may be observed on a compression connector. Many variations of connectors and locations for the phase change material can be considered. Referring to FIG. 3 one embodiment of the electrical connector 12 is shown with a connector section 18, a first connection section 22 and a second connection section 24. The connector performance indicating section 20 is painted onto the connector section 18 as a dot and has a general silver color. In an alternate embodiment, the connector performance indicating section 20 could have any suitable shape and any suitable natural color. The first connection section 22 comprises a fastener connection section which is adapted to receive fasteners (not shown) to attach the first connection section to the first conductor. The second connection section 24 comprises a tube shaped section which is adapted to receive an end of the second conductor and be crimped or compressed onto the second conductor.

Figure 4:
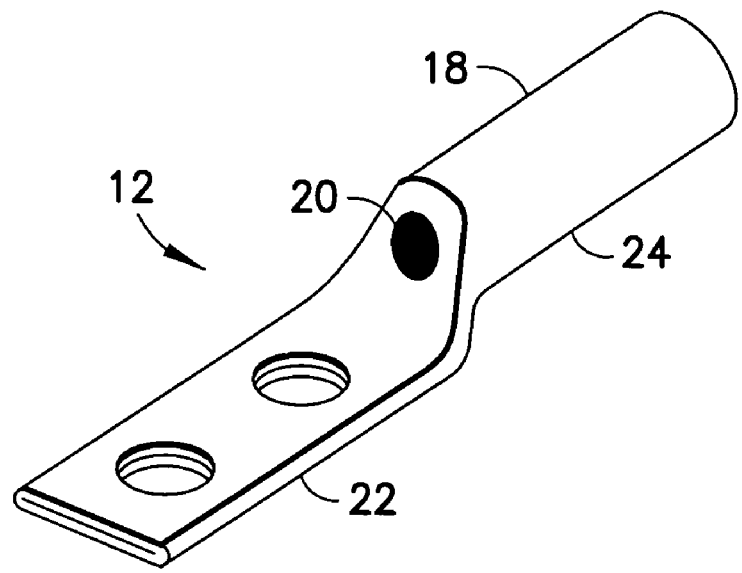
FIG. 4 is a perspective view of the electrical connector shown in FIG. 3 after being subjected to a temperature above a predetermined temperature.

Referring now to FIG. 4, the electrical connector 12 of FIG. 3 is shown after the connector has been subjected to heat above a predetermined temperature. The color of the connector performance indicating section 20 has changed from silver to black. This provides a simple and easy to identify indication that the connector 12 has been subjected to a temperature above the predetermined temperature. This can signal or indicate that the connection with the first or second conductors by the electrical connector is having, or has had, a connector performance issue. This provides a performance feedback for the electrical connector and can signal maintenance issues with the electrical connector or the joints with the first or second electrical conductors. The color indicating an over-temperature condition could be a color other than black. For example, the color could be blue, grey, orange, white, green, etc. In an alternate embodiment, the connector performance indicating section 20 could change to any suitable natural color or signaling pattern or indicium. In one type of embodiment, the paint starts as red, and changes to black at about 65° C.

It is important to note that the design concept of performance feedback electrical connectors can be expanded to other methods beyond phase change paints. Radio frequency devices and other feedback systems may be researched in conjunction with this project.

The invention could be combined with thermal shielding of the temperature sensitive indicator material. The thermal shielding could shield the temperature sensitive indicator material from sources of heat that are not generated by a corresponding electrical connector. For example, one instance is where the exterior of an electrical connector could be subjected to direct sunlight, and the heat/UV radiation could give a false indication of failure; even though the metal core has not been heated to an unacceptable heat level. As another example, the electrical connector could be located close to a heat source, such as a furnace or burner. As another example, if the connector is side-by-side with another connector, the heating of one connector could cause the external temperature sensitive indicator material on the other connector to turn color. One possible shielding is a transparent UV or heat resistant coating over the exterior surface of the temperature sensitive indicator material. The temperature sensitive indicator material could be insulated on the external side, but not the side adjacent to the connector itself. A cowl or hood could serve the same purpose.

The invention could also be used by mixing a temperature sensitive indicator material, or even a non-temperature sensitive indicator material which is merely colored, with a melt material that melts at a predetermined temperature. The melt material, such as paraffin or solder or plastic, could be positioned inside of an electrical connector. If the conductive portion of the connector reaches the melting point of the melt material, the material could melt and pour out of a hole in the electrical connector or coating of the electrical connector. If provided as a paint, the paint could make the material visible for inspection purposes. The temperature sensitive indicator material or colored marker could be encapsulated by the melt material, which could subsequently rupture upon excessive heat above a predetermined temperature, or could be mixed with the melt material, etc.

The invention can provide a compressible electrical connector that carries a performance indicator. A compressible electrical connector is different from circuit breakers and fuses. In the past, it was not obvious to apply a performance indicator to a compressible connector before the connector is crimped because the crimping operation can adversely affect the mechanical attachment of the performance indicator to the connector. The compressible connectors are stamped with various numbers and symbols. However, the indicia stamped on the connectors can smear or distort after the crimp is made. Therefore, was not obvious not include a performance indicator on a compressible connector because it did not make sense, prior to the invention, to add a component (and cost) that one skilled in the art would have known would be mangled during the crimping process. However, it has been discovered that enough of the performance indicator can remain on the connector after the crimping operation to provide a visual indication.

In one type of alternate embodiment, the connector member having the indicator could be an electrical contact terminal which is part of an electronic device, or located on a housing of an electrical connector. The outer surface of the connector can define a dimple or recessed area that can receive the performance indicator. This can help with any surface wiping problems. Applying paint to the conductor receiving sides of a compressible connector might not be commercially viable, because the insulation of the mating wires could obscure the sides of the connector from view. This could defeat the purpose of the visual indicator. However, in some embodiments, placement of the material on the mating sides of the connector could be used.

A heat indication sticker that is attached to the connector before or after the crimp could also be used. These types of stickers are already commercially available. Temperature indicating paint could also be applied to the connector before or after crimping. Other optional features include a UV protective layer over the paint/sticker and/or a colored material that changes phase when exposed to heat. For example, solid to liquid, and if it cools down again, the shape of the re-solidified material would be different. Multiple indicators can also be used on a single connector. For example, each could be activated by a particular temperature range, e.g. 60-65 C, 65-70 C, etc.

Figure 5:
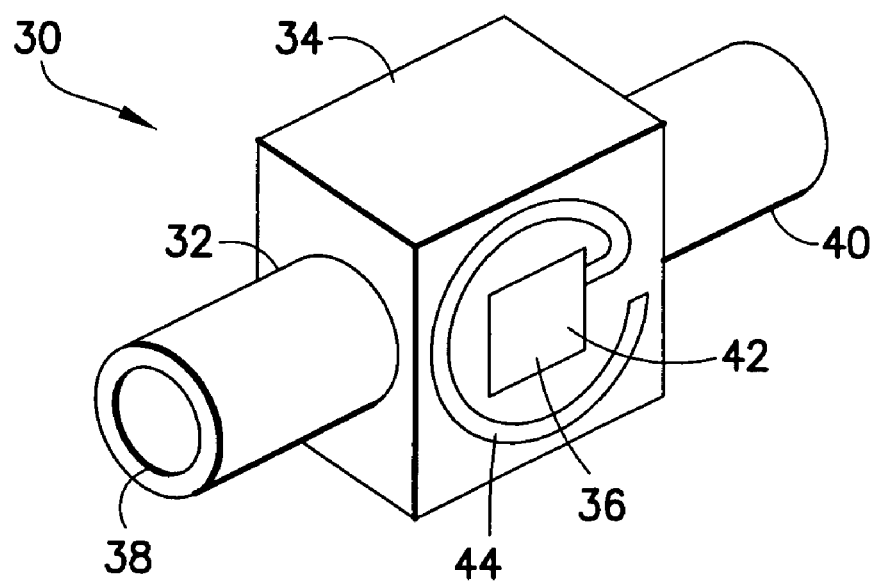
FIG. 5 is a perspective view of an alternate embodiment of the invention which uses a Radio-Frequency Identification (RFID) tag attached to the connector.

Referring also to FIG. 5, an alternate embodiment of the invention is shown. In this embodiment an electrical connector 30 is provided comprising a connector section 32 and a connector performance indicating section 34. The connector performance indicating section 34 comprises a Radio-Frequency Identification (RFID) tag 36 attached to the connector section 32. The connector section 32 generally comprises a first connection section 38 and a second connection section 40. In alternate embodiments, more than two connection sections could be provided. The connector section is preferably made of electrically conductive material, or at least has an electrically conductive path between the two connection section 38, 40. In the embodiment shown the connection sections 38, 40 are tube shaped sections adapted to be crimped onto separate electrical conductors. Thus, the connector section can electrically and mechanically connect the separate electrical conductors to each other. In alternate embodiments, any suitable size and shaped connection sections could be provided.

The RFID tag 36 generally comprises an RFID chip 42 and an antenna 44. The RFID chip 42 comprises a transceiver which is adapted to send a signal to the antenna based upon receipt of an appropriate incoming radio frequency signal by the antenna. The incoming radio frequency signal powers the RFID tag. The signal adapted to be sent to the antenna by the RFID chip comprises a fixed identifier code or other fixed code stored in the RFID chip. In general, a RFID tag could be positioned on the connector in such a way that the antenna 44 and chip 42 are not destroyed by crimping of the connection sections 38, 40 onto their respective conductors.

The RFID tag can function as part of the performance indicating section attached to the crimpable connector 30. Similar to the paint/sticker embodiments described above, the RFID tag could be used to signal occurrence of a temperature of a portion of the connector section above a predetermined temperature (an over-temperature occurrence) and/or transmit heat readings via the RFID tag.

Figure 6:
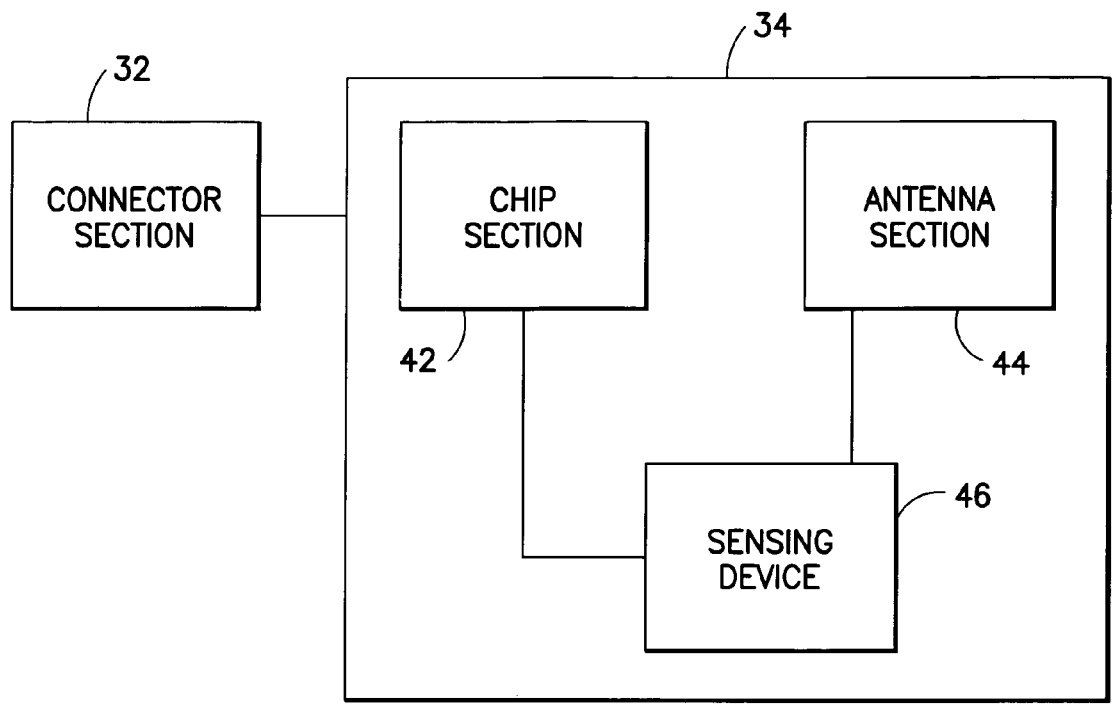
FIG. 6 is a diagram showing connection of components of the electrical connector shown in FIG. 5.

Referring also to FIG. 6, a diagram illustrating the connector 30 is shown. The connector performance indicating section 34 comprises a sensing device 46. The sensing device 46 could be any suitable type of sensing device, such as a temperature sensor, a pressure sensor, a strain sensor, a humidity sensor, etc. In is embodiment the sensing device is a thermocouple adapted to sense temperature of a portion of the connector section 32. However, in alternate embodiments, any suitable temperature sensor could be provided. In this embodiment, the thermocouple 46 provides part of an electrical circuit between the RFID chip 42 and the antenna section 44. The thermocouple 46 is normally closed in an ON state to allow transmission of signals between the chip section 42 and the antenna section 44. However, if the thermocouple 46 is subjected to a temperature above a predetermined temperature, the thermocouple can open to create an OFF state. This would break the circuit path between the chip section 42 and the antenna section 44 thereby inactivating the RFID tag. This inactivation by the thermocouple is preferably permanent. However, in an alternate embodiment it could be temporary, such as by repair, replacement or resetting of the thermocouple.

Referring also to FIG. 7, a diagram is shown where three first conductors 48 are connected to three of the connectors 30. The three connectors 30 are connected to a bus bar second conductor 50. The system comprises a reader 52. The reader 52 is an RFID reader which is adapted to output a first radio frequency signal 54 which is sent by wireless transmission over the air in the direction towards the connectors 30.

Assuming the sensing device 46 of each of the connector performance indicating sections 34 is in an ON state, the first signal 54 can be received by the antenna sections 44 and sent to the chip sections 42. The chip sections 42 then respond by sending a second signal, with each of their respectively different codes, back to the antenna sections 44 for transmission as second radio frequency signals 56', 56", 56''' back to the reader 52. The reader can read and perhaps record the second radio frequency signals. In the event of an over-temperature condition at one of the connectors 30, such as at connector A, the thermocouple 46 of the connector A would open to form an OFF state. Therefore, signal 56' would not be received by the reader 52 and the user would know that there was a potential problem with connector A. More specifically, non-receipt of the signal 56' could be used to signal occurrence of a temperature at the connector 30 above a predetermined temperature; the temperature required to open the thermocouple 46 of the connector A. Thus, the user could review the connector A and determine if it should be repaired or replaced.

With the invention, a passive temperature sensing RFID tag can be provided as part of an electrical connector, such as attached as an adhesive tag for example. Periodically, such as during a maintenance review schedule, or as desired, such as when a problem is detected in a system, a reader can be taken by a user (or activated if mounted in a stationary location or on a vehicle, and request sensed data (such as temperature for example) and perhaps form a log. The data can be used to alert a condition of a probably damaged connector, or indicate that a connector is near a condition where it should be service or replaced. The invention can utilized the electrically conductive portion of the connector to enhance the RF signal by forming the antenna, part of the antenna, or a second antenna. The invention can utilize a conductor/connector network as the antenna. The invention can utilize a passive tag to record and communicate connector(s) condition(s) such as temperature for example.

Figure 8:
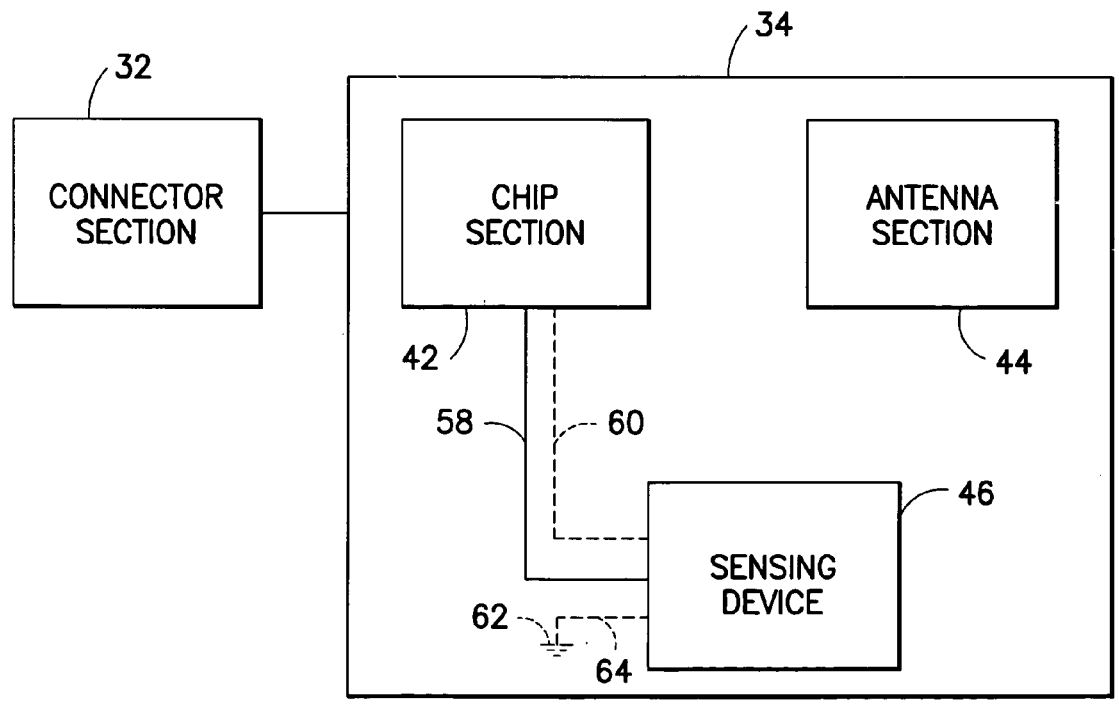
FIG. 8 is a diagram showing connection of components of an alternate embodiment of the invention shown in FIG. 6.

Referring also to FIG. 8, an alternate embodiment of the invention is shown. In this embodiment the chip section 42 is directly coupled to the antenna section 46, and the sensing device 46 is coupled to the chip section 42 as an input on line 58, or as part of a circuit with lines 58 and 60, or as part of a circuit to ground 62 with lines 58 and 64. In this embodiment the sensing device is a thermocouple which, similar to the embodiment described above, is adapted to be open or closed based upon sensed temperature of the connection section 32. If the temperature of a portion of the connection section 32 exceeds a predetermined temperature (e.g., the temperature needed to open the thermocouple the chip section 42 can be prevented from sending the second radio frequency signal 56 to the reader. In an alternate embodiment, rather than turning the RFID feature OFF, the circuit could be adapted to turn the RFID feature ON when an over-temperature condition occurs (or other predetermined sensed condition occurs).

Figure 9:
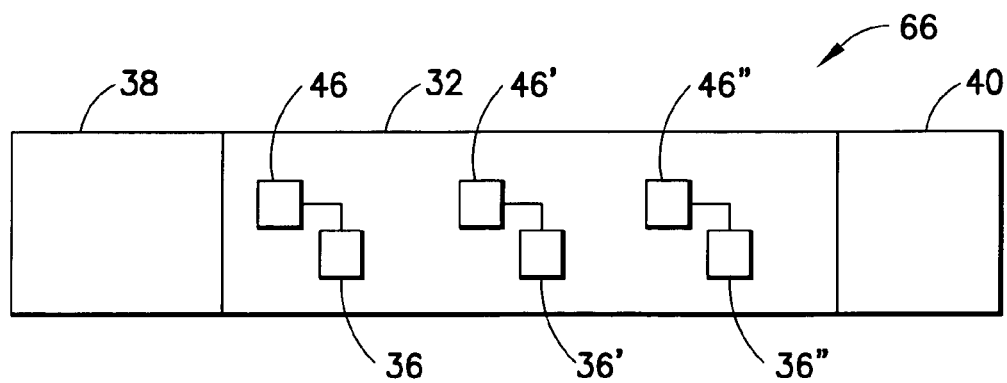
FIG. 9 is a block diagram showing another alternate embodiment of the invention.
Figure 10:
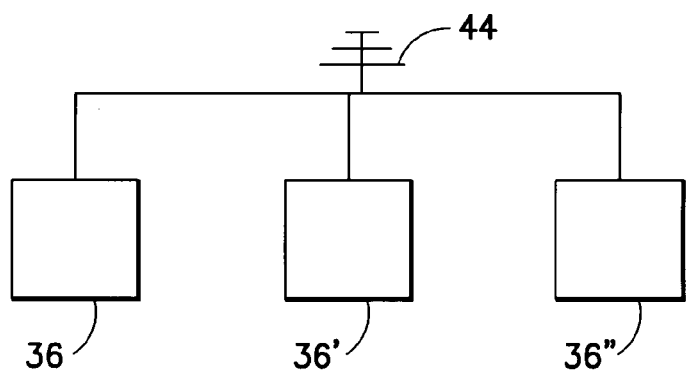
FIG. 10 is a block diagram showing another alternate embodiment of the invention.
Figure 11:
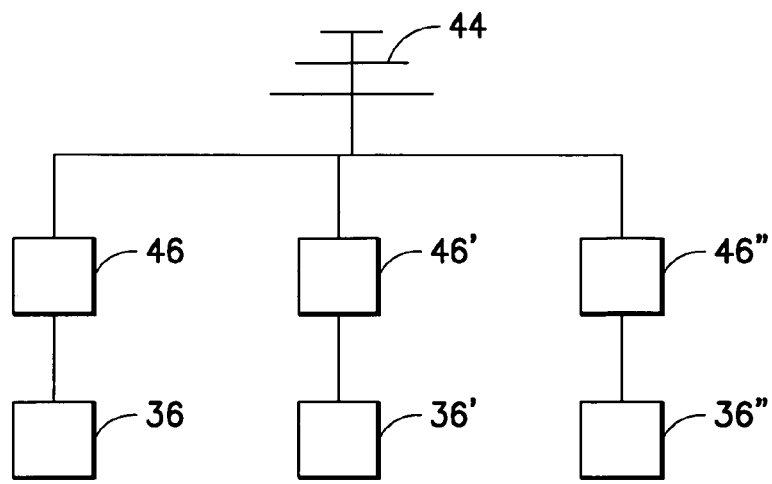
FIG. 11 is a block diagram showing another alternate embodiment of the invention.

The RFID embodiments described above each have one RFID chip. However, as shown with reference to FIG. 9, a single connector 66 could comprise multiple RFID tags 36, 36', 36", etc. Each tag could be connected to a different sensing device 46, 46', 46", etc. Each tag preferably has a different RFID code and each sensing device has a different set point for ON/OFF, such as three thermocouples having three different open/closed temperature set points for example. The tags can each have their own antenna sections, or can share a common antenna as shown in FIGS. 10 and 11. The sensing device(s) could be provided on or in the chip. The antenna section(s) could be provided integrally with the chips. Alternatively, the connector section 32 of the connector (or another electrically conductive portion of the connector) could provide the function of the antenna section. Thus, a separate member for the antenna section is not required.

Figure 12:
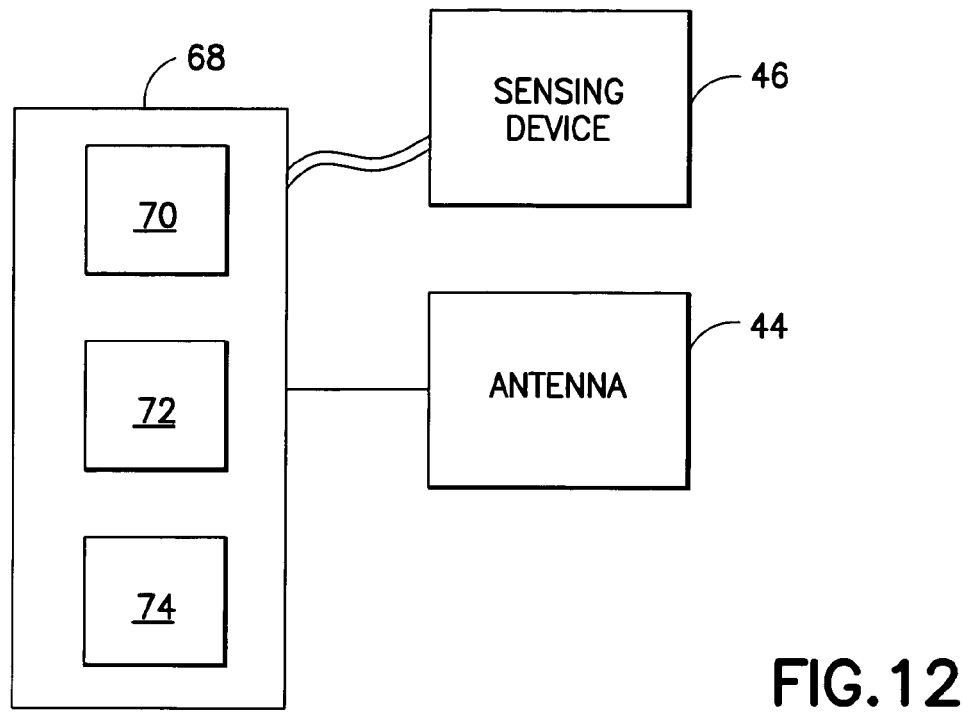
FIG. 12 is a block diagram showing another alternate embodiment of the invention.

Referring also to FIG. 12, another alternate embodiment is shown. In this embodiment a single RFID chip 68 is provided. The chip is coupled to the sensing device 46 and antenna 44 such as described with reference to FIGS. 6 and 8 for example. The chip 68 has multiple RFID chip sections 70, 72, 74. Each chip section has its own RFID code and may be separately coupled to different outputs or inputs of the sensing device 46. The sensing device 46 could be adapted to output different signals, or provide different circuit paths, to the chip 68 based upon different sensed conditions of the connector. For example, with the three chip sections 70-74, the sensing device could be adapted to sense three pre-set different temperatures and allow use or non-use of the respective chip sections 70-74 based upon those temperatures. Thus, the chip 68 could output three RFID codes, two RFID codes, one RFID code or no RFID codes based upon the maximum temperature which the sensing device has been exposed to. Alternatively, if the sensing device is a non-permanent type of sensing device, the chip 68 could output three RFID codes, two RFID codes, one RFID code or no RFID codes based upon the actual temperature of the connector during reading with the reader 52.

Figure 13:
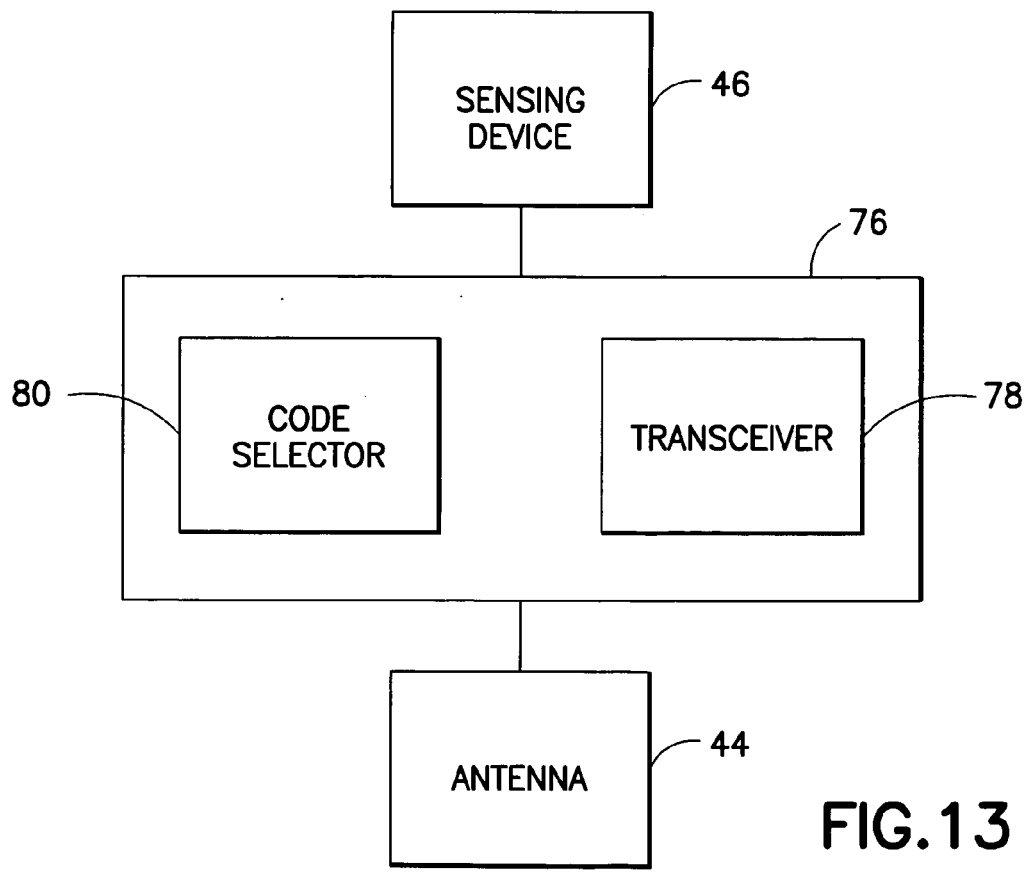
FIG. 13 is a block diagram showing another alternate embodiment of the invention.

Referring also to FIG. 13, another alternate embodiment of the invention is shown. In this embodiment a RFID chip 76 is provided which is coupled to an antenna section 44 and a sensing device 46, such as described with reference to FIGS. 6 and 8 for example. The chip 76 comprises a transceiver section 78 and a code selector section 80. The sensing device is adapted to provide a sensed condition status (such as temperature, pressure, strain, etc.) (either maximum or current state for example) of the connector to the chip 76. The code selector section 80 is adapted to select a code to be transmitted by the antenna to the reader based upon the sensed condition status. For example, the code could represent the actual temperature of the connector or the maximum temperature reached by the connector. The code selector section could be adapted to send the RFID code with a base code section and an attached sensed condition code section as a combined hybrid RFID signal. For example, referring also to FIG. 14, the reader 52 shown in FIG. 7 could have a display 82 which is adapted to display an identification 84 of connectors, a temperature 86 (or maximum reached temperature) of the connector, and a date/time 88 the reading was taken.

Figure 15:
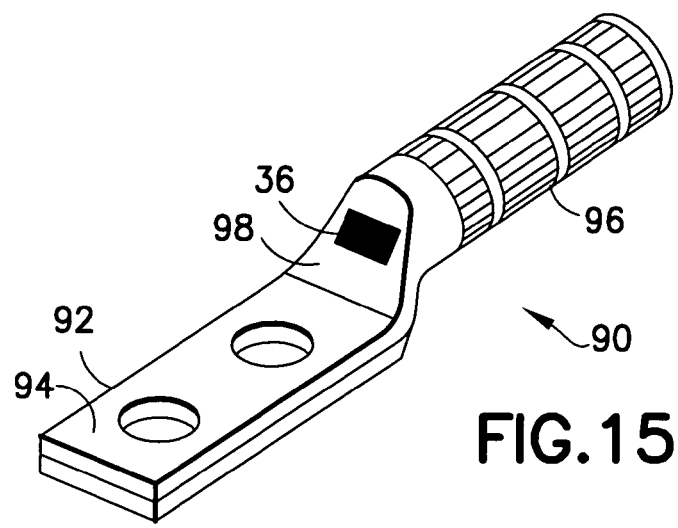
FIG. 15 is a perspective view of one embodiment of the invention.

FIG. 15 shows one embodiment of the invention wherein the RFID tag 36 is part of an electrical connector 90 having a connector section 92. The connector section 92 comprises a first connection section 94, a second connection section 96, and a transition section 98 between the two connection sections 94, 96. The first connection section 94 comprises a fastener connection section which is adapted to receive fasteners (not shown) to attach the first connection section to the first conductor. The second connection section 96 comprises a tube shaped section which is adapted to receive an end of the second conductor and be crimped or compressed onto the second conductor. The RFID tag is connected to the transition section 98; perhaps with a sensing device between the RFID tag and the transition section. The sensing device could comprise electrically conductive paint of a label which is adapted to provide an electrical path between the chip and the antenna of the tag, but not provide the path when heated above a predetermined temperature (such as a permanent break in the circuit path). For example, part of the electrical circuit between the RFID chip and the antenna could be comprises of an electrically conductive material which is adapted to melt at a predetermined temperature and flow way from the circuit path, thereby causing a break in the circuit path when an over-temperature condition occurs. The tag could also be connected to the connector section by one or more intermediate members.

Figure 16:
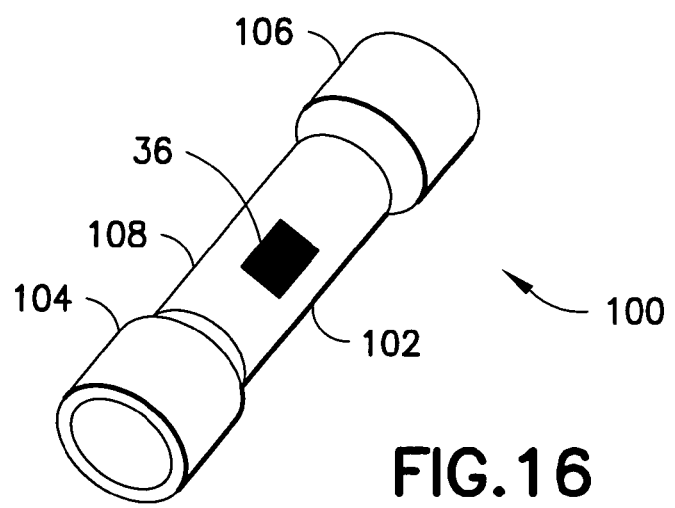
FIG. 16 is a perspective view of another embodiment of the invention.
Figure 17:
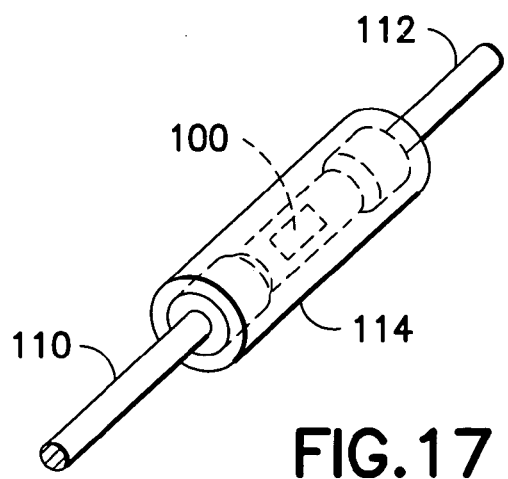
FIG. 17 is a perspective view of a protective cover mounted on the connector shown in FIG. 16.

FIG. 16 shows another embodiment of the invention wherein the RFID tag 36 is part of an electrical connector 100 having a connector section 102. The connector section 102 comprises a first connection section 104, a second connection section 106, and a middle section 108 between the two connection sections 104, 106. The first connection section 104 comprises a tube shaped section which is adapted to receive an end of the first conductor and be crimped or compressed onto the first conductor. The second connection section 106 comprises a tube shaped section which is adapted to receive an end of the second conductor and be crimped or compressed onto the second conductor. The RFID tag is connected to the middle section 108; perhaps with a sensing device between the RFID tag and the transition section. Thus, the tag 36 is located at an area space from the crimp zones of the sections 104, 106. Referring also to FIG. 17, the connector 100 is shown connected to two conductors 110, 112. A protective cover 114 can be mounted over the connector 100 to protect the RFID tag 36.

Examples of use of the invention include use of a thermocouple and wire combination. Other temperature sensing devices could be used. The invention can utilize the features of transmitting signals through radio frequency coupled with sensing parameters such as temperature, pressure, stain, and humidity for example. The invention can be used with compression or mechanical connectors, for example, and/or with providing protecting covers to transition surfaces or non-deformed surfaces. The invention can be used to achieve performance (real time or potentially data logged) measures on an electrical connector or device of apparatus having an electrical connector.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An electrical connector comprising:
a connector section comprising a first connection section adapted to connect to a first electrical conductor and a second connection section adapted to connect to a second electrical conductor, wherein the connector section is adapted to electrical connect the first electrical conductor to the second electrical conductor; and
a connector performance indicating section connected to a portion of the connector section, wherein the connector performance indicating section comprises a temperature sensitive indicator adapted to signal occurrence of a temperature of the portion of the connector section above a predetermined temperature, wherein the temperature sensitive indicator comprises a Radio Frequency Identification (RFID) tag,
wherein the RFID tag comprises a chip section and an antenna section, and wherein the connector performance indicating section comprises a temperature sensitive electrical section coupling the chip section to the antenna section, and wherein the temperature sensitive electrical section is adapted to interrupt signal transmission between the chip section and the antenna section when the predetermined temperature is reached.

2. An electrical connector as in claim 1 wherein the first connection section comprises a crimp connection section, wherein the connector section comprises a non-crimp section which is adapted not to be deformed when the electrical connector is connected to the first and second electrical conductors, and wherein the RFID tag is connected to the non-crimp section.

3. An electrical connector as in claim 1 wherein the connector performance indicating section is adapted to permanently record the occurrence of the temperature of the portion above the predetermined temperature.

4. An electrical connector as in claim 1 wherein the RFID tag comprises multiple RFID tags.

5. An electrical connector as in claim 1 wherein the temperature sensitive indicator comprises a thermocouple.

6. An electrical connector as in claim 1 wherein the temperature sensitive indicator comprises a temperature sensing device.

7. An electrical connector as in claim 1 wherein the connector performance indicating section comprises a pressure sensing device.

8. An electrical connector as in claim 1 wherein the temperature sensitive indicator is adapted to modify the response signal to be sent from the RFID tag based upon occurrence of the temperature of the portion above the predetermined temperature.

9. An electrical connector as in claim 1 wherein the temperature sensitive indicator is adapted to select the response signal to be sent from the RFID tag based upon occurrence of the temperature of the portion above the predetermined temperature.

10. An electrical connector comprising:
a connector section comprising a first connection section adapted to connect to a first electrical conductor and a second connection section adapted to connect to a second electrical conductor, wherein the connector section is adapted to electrical connect the first electrical conductor to the second electrical conductor; and
a connector performance indicating section connected to a portion of the connector section, wherein the connector performance indicating section comprises a temperature sensitive indicator adapted to signal occurrence of a temperature of the portion of the connector section above a predetermined temperature, wherein the temperature sensitive indicator comprises a Radio Frequency Identification (RFID) tag,
wherein the RFID tag comprises at least one antenna and multiple chip sections coupled to the at least one antenna, each chip section comprising a different RFID response signal code.

11. An electrical connector comprising:
a connector section comprising a first connection section adapted to connect to a first electrical conductor and a second connection section adapted to connect to a second electrical conductor, wherein the connector section is adapted to electrical connect the first electrical conductor to the second electrical conductor; and
a connector performance indicating section connected to a portion of the connector section, wherein the connector performance indicating section comprises a temperature sensitive indicator adapted to signal occurrence of a temperature of the portion of the connector section above a predetermined temperature, wherein the temperature sensitive indicator comprises a Radio Frequency Identification (RFID) tag,
wherein the connector performance indicating section comprises a strain sensing device.

12. An electrical connector comprising:
a connector section comprising a first connection section adapted to connect to a first electrical conductor and a second connection section adapted to connect to a second electrical conductor, wherein the connector section is adapted to electrical connect the first electrical conductor to the second electrical conductor; and
a connector performance indicating section connected to a portion of the connector section, wherein the connector performance indicating section comprises a temperature sensitive indicator adapted to signal occurrence of a temperature of the portion of the connector section above a predetermined temperature, wherein the temperature sensitive indicator comprises a Radio Frequency Identification (RFID) tag,
wherein the connector performance indication section comprises a humidity sensing device.

13. An electrical connector comprising:
a connector section comprising a first connection section adapted to connect to a first electrical conductor and a second connection section adapted to connect to a second electrical conductor, wherein the connector section is adapted to electrical connect the first electrical conductor to the second electrical conductor;
a connector performance indicating section connected to a portion of the connector section, wherein the connector performance indicating section comprises a temperature sensitive indicator adapted to signal occurrence of a temperature of the portion of the connector section above a predetermined temperature, wherein the temperature sensitive indicator comprises a Radio Frequency Identification (RFID) tag; and
a protective cover connected to the connector section and covering the RFID tag.

14. An electrical connector comprising:
a connector section comprising a first connection section adapted to connect to a first electrical conductor and a second connection section adapted to connect to a second electrical conductor, wherein the connector section is adapted to electrical connect the first electrical conductor to the second electrical conductor; and
a connector performance indicating section connected to a portion of the connector section, wherein the connector performance indicating section comprises a Radio Frequency Identification (RFID) section comprising at least one RFID chip,
wherein the RFID section comprises an RFID chip electrically coupled to the connector section, wherein the connector section is adapted to function as an antenna for the RFID chip.

15. An electrical connector as in claim 14 wherein the RFID section comprises multiple RFID chips.

16. An electrical connector as in claim 14 wherein the connector performance indicating section is adapted to send an RFID response signal based upon an incoming RFID polling signal and at least one condition of the electrical connector comprising at least one of temperature, pressure, stain and humidity.

17. An electrical connector comprising:
a connector section comprising a first connection section adapted to connect to a first electrical conductor and a second connection section adapted to connect to a second electrical conductor, wherein the connector section is adapted to electrical connect the first electrical conductor to the second electrical conductor; and
a connector performance indicating section connected to a portion of the connector section, wherein the connector performance indicating section comprises a Radio Frequency Identification (RFID) section comprising at least one RFID chip,
wherein the connector performance indicating section comprises at least one RFID chip and at least one antenna section coupled to the at least one RFID chip by at least one thermocouple.

* * * * *